«12» United States Patent
Ahlgren et al.

«10» Patent No.: US 10,662,092 B2
«45» Date of Patent: May 26, 2020

«54» METHOD FOR REMOVING HUMIC SUBSTANCES FROM AN AQUEOUS ALKALINE SOLUTION

«71» Applicant: Kemira Oyj, Helsinki (FI)

«72» Inventors: Jonni Ahlgren, Espoo (FI); Sakari Halttunen, Espoo (FI); Jussi Ruotsalainen, Espoo (FI); Maria Luhtala, Kirkkonummi (FI); Miia Niemelä, Helsinki (FI)

«73» Assignee: Kemira Oyj, Helsinki (FI)

« * » Notice: Subject to any disclaimer, the term of this patent is extended or adjusted under 35 U.S.C. 154(b) by 226 days.

«21» Appl. No.: 15/756,926

«22» PCT Filed: Aug. 31, 2016

«86» PCT No.: PCT/FI2016/050595
§ 371 (c)(1),
(2) Date: Mar. 1, 2018

«87» PCT Pub. No.: WO2017/037340
PCT Pub. Date: Mar. 9, 2017

«65» Prior Publication Data
US 2018/0244549 A1    Aug. 30, 2018

«30» Foreign Application Priority Data

Sep. 2, 2015  (FI) .................................... 20155628

«51» Int. Cl.
*C02F 1/52* (2006.01)
*B01D 21/01* (2006.01)
*C02F 1/56* (2006.01)
*C02F 103/28* (2006.01)
*C02F 101/30* (2006.01)

«52» U.S. Cl.
CPC ............ *C02F 1/5263* (2013.01); *B01D 21/01* (2013.01); *C02F 1/56* (2013.01); *C02F 2101/30* (2013.01); *C02F 2103/28* (2013.01)

«58» Field of Classification Search
None
See application file for complete search history.

«56» References Cited

U.S. PATENT DOCUMENTS

| 3,639,206 | A | * | 2/1972 | Spruill | .................. | C02F 1/5236 |
| | | | | | | 162/29 |
| 5,178,770 | A | | 1/1993 | Chung | | |
| 5,681,480 | A | | 10/1997 | Langley et al. | | |
| 2010/0282425 | A1 | * | 11/2010 | Karppi | .................. | C08B 31/006 |
| | | | | | | 162/175 |

FOREIGN PATENT DOCUMENTS

| WO | 9962957 A1 | 12/1999 |
| WO | 2004041732 A1 | 5/2004 |
| WO | 2005075687 A2 | 8/2005 |
| WO | 2012010744 A1 | 1/2012 |
| WO | 2015086783 A1 | 6/2015 |

OTHER PUBLICATIONS

Qingxian Miao et al, Advances in the control of dissolved and colloidal substances present in papermaking processes: a brief review. BioResources, 2013 vol. 8, No. 1, Feb. 2013, pp. 1431-1455. ISSN: 1930-2126. 1-10 Chapter "Introduction" on pp. 1431-1433.
Finnish Patent Office, Search Report FI20155628, dated Mar. 2016.
Search report for RU20181111392 issued by Federal Service of Intellectual Property Federal Insitute of Industral property (FIPS) dated Jan. 24, 2020. 2 pages.

* cited by examiner

*Primary Examiner* — Bradley R Spies
«74» *Attorney, Agent, or Firm* — Berggren LLP

«57» ABSTRACT

A method for removing humic substances comprising lignin, other lignin type compounds and their disintegration products from an aqueous alkaline waste water from a bleaching of chemical pulp, which method comprises —obtaining an aqueous alkaline waste water comprising humic substances such as dissolved lignin, and —adding a high cationic starch having a charge density value of at least 1.8 meq/g dry matter of starch derivates determined at pH 7-7.5 to the alkaline waste water to precipitate humic substances.

11 Claims, No Drawings

METHOD FOR REMOVING HUMIC SUBSTANCES FROM AN AQUEOUS ALKALINE SOLUTION

PRIORITY

This application is a U.S. national application of PCT-application PCT/FI2016/050595 filed on Aug. 31, 2016 and claiming priority of Finnish application FI 20155628 filed on Sep. 2, 2015, the contents of all of which are incorporated herein by reference.

The present invention relates to a method for removing humic substances comprising lignin, other lignin type compounds and their disintegration products from an aqueous alkaline solution, such as waste water from a bleaching of chemical pulp, according to the independent claim presented below.

The bleaching sequence of chemical pulp often comprises one or several oxidizing agent steps and so the bleaching conditions with respect to pH are alkaline. Under these conditions, the lignin and other lignin type compounds contained in the pulp is partly dissolved. After bleaching, the pulp is washed and the drained water is normally passed to a water treatment unit. Lignin is considered as a sparingly biodegradable substance, thus having a great influence on the properties of purified waste water. Therefore it would be desirable to be able to remove a dissolved lignin, other lignin type compounds and their disintegration products from the waste water.

It is known that inorganic coagulants such as calcium or aluminium and iron based metal salts precipitates lignin and other organic substances. Especially, it is known to remove residual organics from waste water with Al or Fe based inorganic metal salt coagulation in tertiary treatment. However, there are several problems due to the use of the metal salts, such as high inorganic sludge production. The residual soluble and colloidal metal also limits water re-use and the final pH needs to be neutralized prior to forward water to further processing, since pH of the alkaline solution need to adjust in range of 5 to 7 to enable coagulation when metal salts are used.

It is an object of the present invention to reduce or even eliminate the above-mentioned problems appearing in prior art.

The object of the present invention is to provide a novel method for removing humic substances comprising lignin, other lignin type compounds and their disintegration products from an aqueous alkaline solution such as waste water from a bleaching of chemical pulp. It is especially an object of the present invention to provide a method for removing humic substances from an aqueous alkaline solution, which method reduces an amount of the inorganic waste.

It is also an object of the invention to provide a method for precipitating humic substances from pulping directly in alkane process flow in the pulp manufacturing. Especially, it is an object to remove dissolved lignin from waste water from a bleaching of chemical pulp.

In order to achieve among others the objects presented above, the invention is characterized by what is presented in the enclosed independent claim. Some preferred embodiments of the invention will be described in the other claims.

A typical method according to the present invention for removing humic substances comprising lignin, other lignin type compounds and their disintegration products from an aqueous alkaline solution such as waste water from a bleaching of chemical pulp comprises at least the following steps

- obtaining an aqueous alkaline solution, such as an alkaline waste water, comprising humic substances such as dissolved lignin,
- adding a high cationic starch having a charge density value of at least 1.8 meq/g dry matter of starch derivates determined at pH 7-7.5 and a viscosity of over 20 mPas measured in a 3% starch solution in water with addition of NaCl in amount of five times that of starch, to the alkaline solution to precipitate humic substances such as lignin, and
- separating precipitated humic substances from the alkaline solution, such as the waste water.

Now it has been surprisingly found out that the humic substances, especially dissolved lignin, can be easily removed from an aqueous alkaline solution such as waste water from a bleaching of chemical pulp by adding a high cationic starch having a charge density value of at least 1.8 meq/g dry matter of starch derivates determined at pH 7-7.5 to the alkaline solution. The high cationic starch can be added directly to the alkaline solution without separate pH adjustment stages, i.e. the high cationic starch precipitates the humic substances such as dissolved lignin and its disintegration products in existing alkaline conditions in the waste water streams of the bleaching of chemical pulp. Using of high cationic starch according to the invention for precipitating the humic substances comprising dissolved lignin and other humic substances, the amount of the inorganic waste can be remarkable reduced in comparison to the prior art solutions using Al or Fe based inorganic metal salts. According to the present invention, the organic cationic coagulant, i.e. cationic starch, is free of Aluminium.

In the present application humic substances originates from chemical pulping process of cellulosic fibre material such as wood and other plant materials. Thus, humic substances refer to organic substances comprising lignin itself, lignin type compounds and their disintegration products and other organic compounds existing in waste waters of a bleaching of chemical pulp.

Especially lignin is separated from cellulose fibres from chemical pulping and it is at least partly dissolved in bleaching of the pulp. Thus, the method according to the invention is preferably used for removing of the dissolved lignin from an aqueous alkaline solution such as effluents from a bleaching of chemical pulp.

Cationic starches and their derivates, which have a charge density value of at least 1.8 meq/g dry matter of the starch derivates determined by titrating at pH 7-7.5 are considered high cationic starches in this application. In this application the terms "at least 1.8 meq/g dry matter of the starch derivates determined at pH 7-7.5" and "at least 1.8 meq/g" are interchangeable and they are used as synonyms to each other. According to an embodiment of the invention the high cationic starch has a charge density value of at least 1.8 meq/g, preferably at least 2 meq/g, and more preferably at least 2.5 meq/g and even more preferably at least 3 meq/g dry matter of starch derivates determined by titrating at pH 7-7.5. According to an embodiment of the invention, the high cationic starch has a charge density value of at least 4 meq/g dry matter of starch derivates. According to one embodiment of the invention the high cationic starch has a charge density in the range of about 1.8-4.5 meq/g dry matter of starch derivates determined by titrating at pH 7-7.5. According to an embodiment of the invention a charge density may be at least 1.8, 1.9, 2, 2.5, 3, 3.5, 4 meq/g dry matter of starch derivates determined by titrating at pH 7-7.5. Charge density of the cationic starch is determined by charge titration, using polyethylene sulfonate solution as titrant and using Mütek PCD-03 or equivalent device for end point detection. Above mentioned charge densities are determined to a substantially pure cationic derivates. The net charge density of the starch is changed, if additives such as inorganic salt or organic substances, e.g. urea or saccharide, are present.

In the context of the present application the term "cationic starch" means starch which has been modified by cationisation. Also, a term "cationised starch" may be used. The cationic starch is organic cationic coagulant and in the present invention it can be in a form of non-dissolved powder, aqueous solution or dispersion in which dispersion the cationic starch is in non-dissolved form. Typically, the cationic starch is in non-dissolved form, typically in form of a dry powder and/or dry granulate material before it is brought together with the solution, the non-dissolved form can comprise moisture and/or additives. Dry solids content of undissolved cationic starch in non-dissolved powder form may be >60 weight-%, preferably >70 weight-%, more preferably >75 weight-%, most preferably >80 weight-%. In the method according to the invention, the cationic starch is used as a solution. The starch used in the method according to the invention is from natural origin. According to an embodiment suitable botanical starches are, for example, selected from a group comprising potato starch, rice starch, corn starch, waxy corn starch, wheat starch, barley starch, sweet potato starch and tapioca starch, potato starch being preferred.

Starch may be cationised by any suitable method. According to a preferred embodiment starch is cationised by using 2,3-epoxypropyltrimethylammonium chloride or 3-chloro-2-hydroxypropyltrimethylammonium chloride.

In addition of the charge density of the cationic starch described above, also the cationicity of the cationic starch may be determined. Cationicity of cationic starch may be defined by using degree of substitution (DS). Degree of substitution defines how many substituted groups are contained in cationic starch, calculated per one anhydroglucose unit of starch. Degree of substitution of cationic starch, which is cationised with 2,3-epoxypropyltrimethylammonium chloride, is typically calculated by using the nitrogen content of pure dry cationic starch, which does not contain any other nitrogen sources than the quaternary ammonium groups. Nitrogen content is typically determined by using commonly known Kjeldahl-method. Degree of substitution of cationic starch, which is cationised with 2,3-epoxypropyltrimethylammonium chloride may be calculated by using the following equation:

$$DS=(162\times N\text{-}\%)/(1400-(N\text{-}\%\times 151.6),$$

where 162 is the molecular weight of an anhydroglucose unit (AHG), N-% is the nitrogen value in %, 1400 is the molecular weight of nitrogen multiplied by 100 and 151.6 is the molecular weight of 2,3-epoxypropyltrimethylammonium chloride.

When the cationisation is made by using 2,3-epoxypropyltrimethylammonium chloride or 3-chloro-2-hydroxypropyltrimethylammonium chloride, charge density of 1.8 meq/g corresponds to a degree of substitution, DS, about 0.4 and to nitrogen content about 2.5%. Thus, cationic starches, which have a degree of substitution, DS, >0.4 are considered high cationic starches in this application.

According to an embodiment of the invention the viscosity of the aqueous cationic starch solution used is over 20 mPas, preferably over 40 mPas measured in originally a 3% starch solution, in which sodium chloride has been added in amount of five times that of the starch, when the aqueous cationic starch solution comprises 2.6% starch and 13% NaCl. Salt is used to depress influence of charges on viscosity, and it is a normal procedure among water soluble polyelectrolytes. Viscosity is measured using Brookfield viscometer with 13R chamber and spindle #18 at 25° C. The rotation speed used in the measurement is 60 rpm or lower, when needed. Solution viscosity of a water soluble polymer, e.g. starch, is depending on several issues, the most important ones are polymer concentration, polymer chain length (or molecular weight), polymer charge density and temperature. Thus, the polymer solution viscosity also describes the influence of the polymer chain length High charge density, cationic or anionic charge, gives higher viscosity than the lower charged polymer with the same chain length. Influence of charge density is typically depressed by using high salt concentration in the measuring solution.

A present invention especially relates to lignin and its disintegration products removal from waste water streams of bleaching of chemical pulp. Normally, the bleaching water is alkaline having a pH of about 10. According to an embodiment of the invention the aqueous alkaline solution has a pH over 8, preferably over 9 and more preferably in the range of about 10-12. In the method according to an embodiment of the invention, no adjustment of the pH value is needed before the addition of the cationic starch coagulant to alkaline solution. Thus, the method according to the preferred embodiment of the invention is free of any pH adjustment step.

In the method according to the invention, it is preferable to add the high cationic starch coagulant directly to alkaline solution, e.g. alkaline water stream containing humic substances such as dissolved lignin, for precipitating dissolved lignin and other humic substances. The adequate amount to be added is dependent on the solution or process flow to be treated. According to a preferred embodiment of the invention, the method is used for solutions or process flows where the COD of the untreated solution or process flow is over 1000 g/m$^3$, preferably over 2000 g/m$^3$. According to an embodiment of the invention the method is used for solutions or process flows where the COD of the untreated solution or process flow is in the range of 1000-5000 g/m$^3$, preferably 2000-3000 g/m$^3$. In an embodiment of the invention, the high cationic starch coagulant is added in an amount from 0.1 to 1 g/g COD. In an embodiment of the invention the high cationic starch is added to the aqueous solution in an amount from 0.5 to 5 g/g C of humic substances, more preferably to 1 to 3 g/g C of humic substances.

In a preferred embodiment of the invention the alkaline solution is a filtrate from the bleaching of chemical pulp, when the cationic starch can be added directly to the flow of the filtrate. Thus, the precipitation of the humic substances including dissolved lignin can be easily carried out before waste water treatment process.

The method according to an embodiment of the invention further comprises separating the precipitated humic substances comprising precipitated lignin, from the alkaline solution, such as alkaline water stream. The solids removal is carried out before conveying the aqueous flow to the waste water treatment. The solids are typically removed from the water stream within bleaching process by using disk filter, dissolved air flotation, settling tank or membrane filtration. The reject, i.e. an organic sludge, comprising the precipitated organic substances can be conveyed to black liqueur incinerator or in primary sedimentation prior to biological waste water treatment. The sludge produced by the method according to the invention is organic and therefore the end-disposal can be done with existing incinerators. Thus, the organic substances, such as lignin, removal according to the invention in upstream makes the tertiary treatment of the waste waters unnecessary and also additional investment costs may be avoided.

According to an embodiment of the invention flocculating agent may also be added to alkaline solution for increasing a flock size to be formed and for improving the separation of the precipitated organic substances from the solution or process flow. The flocculating agent is added before the separation of the precipitated humic substances. The flocculating agent addition may be carried out at same time with cationic starch, or it may be added sequentially with the cationic starch. The flocculating agent may be added directly to the alkaline solution or process flow, or it may be added first to an aqueous process flow which is later combined with said alkaline solution or process flow. According to an embodiment of the invention the flocculating agents are polymer flocculants, such as modified polyacrylamides.

The organic sludge produced in the method according to the invention does not contain metals or the content of the metals is insignificant low. The sludge to be conveyed to the incinerator has typically consistency of 3-4%.

According to one preferred embodiment of the invention total COD value of the treated water stream is reduced with at least 40%, preferably at least 50% from the COD value of the water stream before the addition of high cationic starch according to the invention. The COD value of lignin and other lignin like compounds can be reduced at least over 60% compared to the untreated alkaline solution.

EXPERIMENTAL

A better understanding of the present invention may be obtained through the following example which is set worth to illustrate, but is not to be construed as the limit of the present invention.

Waste waters from bleaching contain humic substances such as dissolved lignin. The removal thereof with biological treatment methods is assumed to be difficult. In this work, precipitation of lignin using high cationic starch according to the invention was studied.

Coagulation and flocculation tests for COD removal were carried out in Metsä Fibre Äänekoski mill laboratory. Tests were carried out with fresh wastewater sample from alkaline bleaching filtrate line. Wastewater sample temperature was 65° C.

Batch size was 500 ml in mini flocculator. The flocculator was operated as follows:
1) fast mixing (350 rpm), cationic starch coagulant addition (2000 ppm) in the beginning and flocculating agent dosing (2 ppm) in the end,
2) slow mixing (40 rpm), and
3) sedimentation 10 minutes.

The coagulant used in the test procedure was 1% cationised starch, which has the following properties:
viscosity 471 mPas measured from 3% solution in de-ionised water,
viscosity 47 mPas measured from 3% solution in water with addition of NaCl in amount of five times that of the starch,
charge density 4.0 meq/g dry matter of starch derivates determined by titrating at pH 7-7.5.

The flocculating agent used in the test was 0.1% polymer N7980 solution. The polymer N7980 is a non-ionic polyacrylamide, with standard viscosity (SV) about 4 mPas. SV was measured from a 0.1% polymer in 1M NaCl solution.

Viscosity of cationised starch and polymer solution were measured using Small Sample Adapter of Brookfield viscometer with 13R chamber and spindle #18 at 25° C. The rotation speed used in the measurement is 60 rpm or lower, when needed.

Analyses from the supernatant in the mill laboratory were pH, turbidity, filtered (0.45 μm) UV-abs (254 nm) and COD. Dissolved organic carbon fractions of filtered sample were later analyzed with LC-OCD in Kemira R&D laboratory at Espoo. Experimental results of treated and untreated samples are shown in Tables 1 and 2.

TABLE 1

Test records of treated and untreated sample in the mill.

| | | | | 0.45 μm filtrate | |
| --- | --- | --- | --- | --- | --- |
| Sample name | pH | t [° C.] | Total Turbidity | UV abs 254 nm | COD [mg/l] |
| Alkaline untreated | 10.2 | 65 | 40.2 | 4.2 | 2596 |
| Treated with starch | 10.3 | | 262 | 3.65 | 1264 |

TABLE 2

Test records of DOC fractions of treated and untreated sample.

| | DOC ppm | | | | | |
| --- | --- | --- | --- | --- | --- | --- |
| Sample | Humic Subst. ~1000 | Building Blocks 300-500 | Neutrals <350 | Acids <350 | Bio-Polymers >>20 000 | Total |
| Alkaline untreated | 606 | 142 | 110 | 89 | 5 | 947 |
| Treated with starch | 167 | 113 | 95 | 62 | 18 | 438 |

Concentrations are shown as initial sample volume, test chemical dilution is excluded. The chemical oxygen demand (COD) value of the treated water stream is reduced about 49% from the COD value of the alkaline water stream before the addition of cationised starch, and especially the dissolved organic carbon (DOC) value of humic substances has reduced significantly.

The invention is not restricted to the examples of the above description, but it can be modified within the scope of the inventive idea presented in the claims.

The invention claimed is:

1. A method for removing humic substances comprising lignin, other lignin type compounds and their disintegration products from an aqueous alkaline waste water from a bleaching of chemical pulp, said method comprising:
    obtaining an aqueous alkaline waste water from a bleaching of chemical pulp comprising humic substances, being dissolved lignin,
    adding a high cationic starch having a charge density value of at least 1.8 meq/g dry matter of starch derivates determined at pH 7-7.5 and a viscosity of over 20 mPas, wherein said viscosity is measured in a 3% starch solution in water with addition of NaCl in amount of five times that of starch, to the aqueous alkaline waste water to precipitate humic substances, and
    separating precipitated humic substances from the waste water.

2. The method according to claim 1, wherein the high cationic starch has a charge density value of preferably at least 2 meq/g, at least 2.5 meq/g or at least 3 meq/g dry matter of starch derivates determined at pH 7-7.5.

3. The method according to claim 1, wherein high cationic starch has a charge density in a range of 1.8-4.5 meq/g dry matter of starch derivates determined by titrating at pH 7-7.5.

4. The method according to claim 1, wherein the viscosity of the cationic starch is over 40 mPas measured in a 3% starch solution in water with addition of NaCl in amount of five times that of starch.

5. The method according to claim 1, wherein the aqueous alkaline waste water has a pH over 8, over 9 or in a range of 10 to 12.

6. The method according to claim 1, wherein the high cationic starch is added to the waste water in an amount from 0.5 to 5 g/g C of humic substances, or from 1 to 3 g/g C of humic substances.

7. The method according to claim 1, further comprising:
conveying a sludge comprising the precipitated humic substances to black liquor incinerator.

8. The method according to claim 1, further comprising:
adding a flocculating agent to the alkaline waste water before the separation of the precipitated humic substances.

9. The method according to claim 8, wherein the flocculating agent is selected from polymer flocculants, being modified polyacrylamides.

10. The method according to claim 1, wherein the alkaline waste water is a filtrate from the bleaching of chemical pulp.

11. The method according to claim 1, wherein the COD of the untreated alkaline waste water or process flow is over 1000 g/m$^3$, or over 2000 g/m$^3$.

* * * * *